United States Patent [19]

Fischer

[11] Patent Number: 4,890,595
[45] Date of Patent: Jan. 2, 1990

[54] MOTOR-DRIVEN CHAIN SAW HAVING AN ARRANGEMENT FOR PREHEATING FRESH INTAKE AIR

[75] Inventor: Hartmut Fischer, Winnenden, Fed. Rep. of Germany

[73] Assignee: Andreas Stihl, Waiblingen, Fed. Rep. of Germany

[21] Appl. No.: 239,466

[22] Filed: Sep. 1, 1988

[30] Foreign Application Priority Data

Sep. 5, 1987 [DE] Fed. Rep. of Germany ....... 3729814

[51] Int. Cl.⁴ .......................... F01D 7/10; F02M 31/08
[52] U.S. Cl. ............................... 123/556; 123/65 EM
[58] Field of Search ................... 123/556, 552, 179 H, 123/65 EM, 65 DE; 60/321

[56] References Cited

U.S. PATENT DOCUMENTS

| | | | |
|---|---|---|---|
| 2,781,032 | 2/1957 | Sebok et al. | 123/556 |
| 4,079,715 | 3/1978 | Masaki et al. | 123/556 |
| 4,231,343 | 11/1980 | Alf et al. | 123/556 |
| 4,244,343 | 1/1981 | Yamaguchi et al. | 123/556 |
| 4,249,500 | 2/1981 | Behrendt et al. | 123/556 |
| 4,691,681 | 9/1987 | Hoppner et al. | 123/556 |
| 4,716,860 | 1/1988 | Henriksson et al. | 123/556 |
| 4,765,282 | 8/1988 | Nagashima | 123/556 |

FOREIGN PATENT DOCUMENTS 0011208  2/1978  Japan ................... 123/556

*Primary Examiner*—Willis R. Wolfe
*Assistant Examiner*—M. Macy
*Attorney, Agent, or Firm*—Walter Ottesen

[57] ABSTRACT

The invention is directed to an arrangement for heating the intake air of the carburetor of the engine of a handheld portable tool such as a chain saw. The fresh air entering the air intake line is quickly and adequately heated and directed to the carburetor as intake air without the danger of this intake air becoming entrained with dirt particles. In the arrangement according to the invention, the handheld portable tool can be operated at low temperatures without disturbances in the carburetor system such as freezing of the throttle flap or the main nozzle. The air intake line is lead through the muffler which is configured as a collection chamber for the exhaust gas. The heat of the hot exhaust gases passing through the muffler is transferred to the fresh air entering and passing through the intake line.

21 Claims, 2 Drawing Sheets

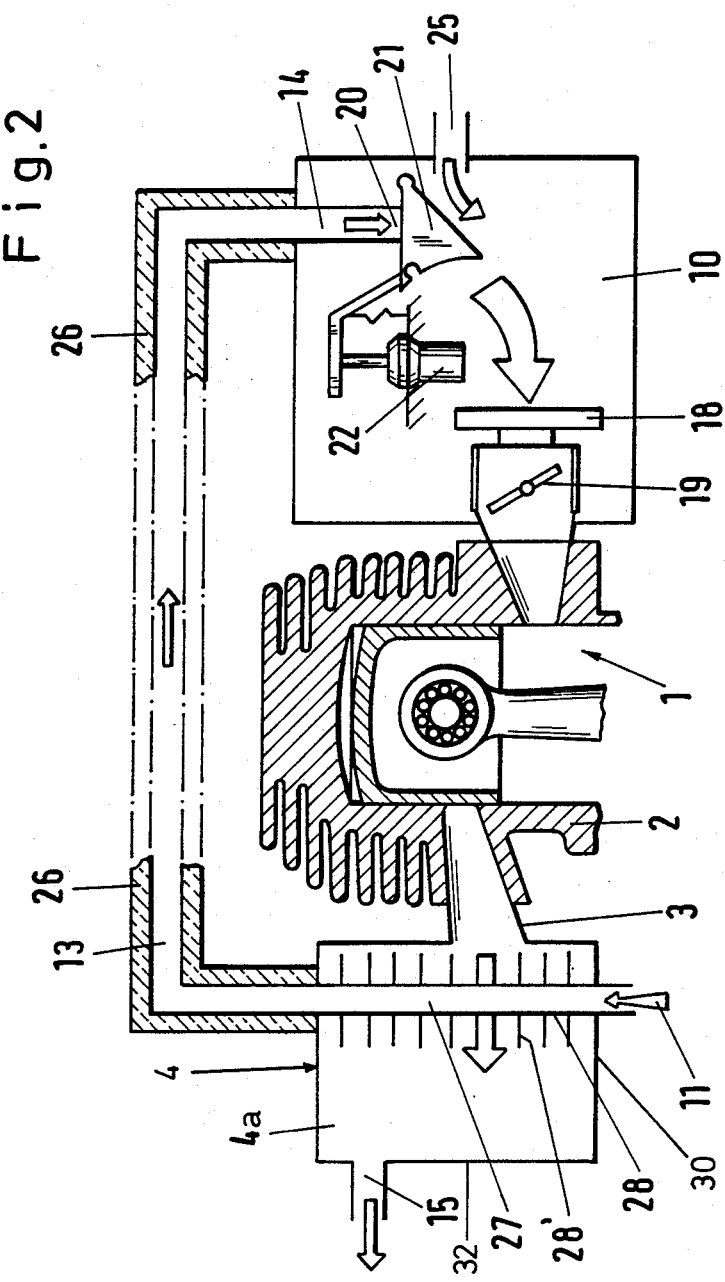

MOTOR-DRIVEN CHAIN SAW HAVING AN ARRANGEMENT FOR PREHEATING FRESH INTAKE AIR

FIELD OF THE INVENTION

The invention relates to a portable handheld chain saw driven by an internal combustion engine. The hot exhaust gases discharged by the engine are utilized to heat the air intake of the carburetor.

BACKGROUND OF THE INVENTION

Handheld motor-driven chain saws of the kind referred to above are used in the colder times of the year at low temperatures such as in the wooded northern regions of Scandinavia, North America and the Soviet Union. The use at low temperatures places special requirements on the internal combustion engine driving the chain saw. The fresh air drawn in by suction by the engine from the ambient air often leads to disturbances in the carburetor system at low temperatures and can lead especially to a freezing, for example, of the throttle flap or the main nozzle.

To prevent the above-mentioned operational disturbances, German Patent No. 3,604,166 discloses that heated cooling air occurring in the region of the outer surface of the cylinder block of the engine can be conducted directly to the carburetor. A fan wheel driven by the engine is provided for cooling the outer surface of the cylinder block and directs a targeted flow of cooling air over the cylinder block. A component air current is branched off of the cooling air flow heated in this manner and is directed to the carburetor. The heated air directed to the carburetor is, however, not adequately heated at low temperatures because the engine operates at idle especially between the individual cuts made with the saw chain and this idle operation causes the rotational speed of the fan as well as the moved air flow to become sharply reduced. For this reason, the heated cooling air which is now present is not adequate to maintain the carburetor system at a constant temperature. Furthermore, dirt particles or the like become entrained because of the fan and these dirt particles are directed with the component air current to the carburetor system and the engine and can lead to disturbances.

SUMMARY OF THE INVENTION

It is an object of the invention to provide an arrangement for heating the intake air of a carburetor by means of which the fresh air is quickly and adequately heated and directed to the carburetor as intake air without the danger of dirt becoming entrained as described above.

According to a feature of the invention, an air intake line leading to the carburetor is provided which passes through an exhaust gas collection chamber configured as a muffler.

The hot exhaust gases discharged by the engine flow into an exhaust gas collecting chamber configured as a muffler and flow therethrough. These hot exhaust gases are utilized for heating the fresh air in that the fresh air flow drawn in by the engine by suction is conducted via the air intake line through the muffler and thereby heated. The heated fresh air flows via the air intake line into the plenum chamber contained in the carburetor and from there passes through the carburetor system to the engine.

A reduction of the motor capacity can occur if the fresh air directed to the carburetor is heated too intensely. To prevent this conduction, the heated fresh air flowing into the plenum chamber is advantageously adjusted to the temperature range which is optimal for operation by means of a temperature-responsive control system in that cold air from the ambient is admixed through an adjustable ancillary air opening.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
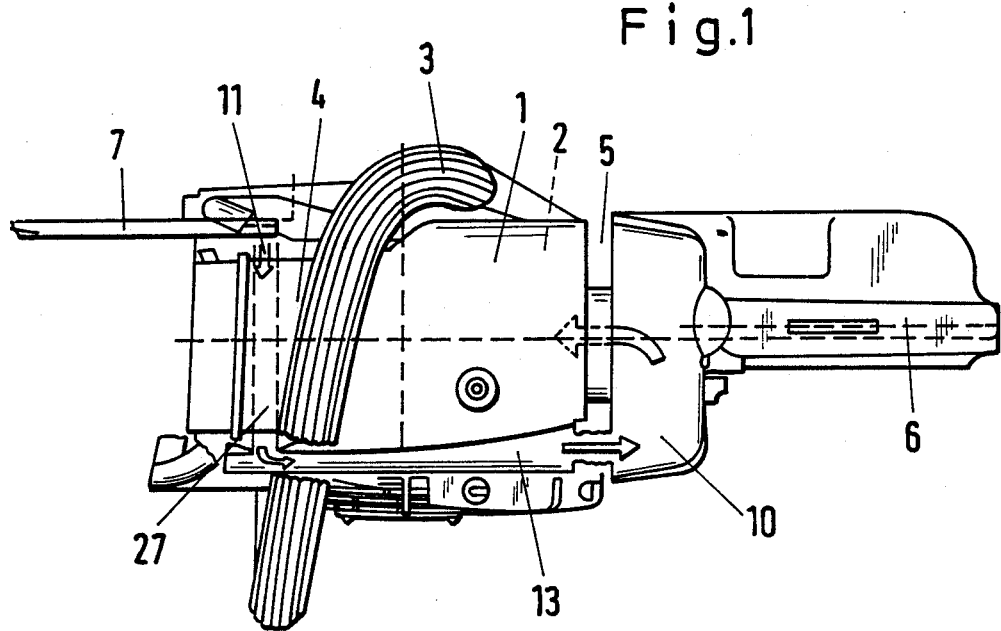
FIG. 1 is a plan view of a chain saw having a fresh air preheating arrangement according to the invention; and, FIG. 2 is a schematic diagram of the engine and the carburetor system showing the fresh air preheating arrangement.

The engine 1 of the drive system of a chain saw includes the cylinder block 2 with the exhaust has line 3 and the muffler 4 configured as an exhaust gas collector 4a having a cross section much greater than the cross section of the exhaust gas line 3. The handle part 6 is connected to the engine 1 across the so-called vibration gap 5 by means of vibration-attenuating intermediate members (not shown) in a manner known per se. The carburetor housing 10 is mounted on the handle portion 6. The guide bar guiding the saw chain 7 extends away from the engine 1 in a direction opposite to that of the handle portion 6 as shown in FIG. 1.

Referring to FIG. 2, the fresh air current drawn in by suction by the engine 1 flows through an inlet opening 11 into an intake air line 27. The intake air line 27 enters the collector 4a of muffler 4 through a first wall 30 thereof and then passes through the collector 4a into which the hot exhaust gases are introduced via the exhaust gas line 3 which extends from the cylinder block 2. The exhaust gases vent to the ambient via the out-flow opening 15 mounted in a second wall 32 of the muffler 4. The out-flow opening 15 has a cross section much less than the cross section of the exhaust gas collector 4a. The out-flow opening 15 is disposed downstream of the exhaust gas conduit 3.

After leaving the muffler 4 disposed on a first side of the engine 1, the intake air line 27 leads to the plenum chamber 10 mounted on a second side of the engine 1 opposite the first side thereof. The plenum chamber 10 contains a fresh-air line (13, 14) as well as an air filter 18 and the carburetor 19. The cross section of the out-flow opening 20 of the fresh air line (13, 14) in the plenum chamber 10 is changed by means of an adjusting device 21 via a temperature-controlled regulator system 22 such that the fresh air flows from the plenum chamber 10 to the air filter 18 and so to the carburetor 19 at a constant temperature required for the optimal operation of the engine 1 and the carburetor 19. In this way, a freezing of the throttle flap and of the main nozzle is reliably prevented.

An ancillary air inlet opening 25 communicates directly with the ambient air and the cold air required for maintaining the temperature in the plenum chamber 10 flows through this inlet opening 25 with the cross section of the latter being likewise changeable by the control system 22.

The line segment 13 of the fresh air line (13, 14) is provided with a heat-insulating jacket 26 to prevent heat loss of the heated fresh air flowing in this segment 13 between the muffler 4 and the plenum chamber 10.

The air intake line 27 coming through the muffler 4 can be helical or serpentine in shape so as to extend its overall length within the muffler to thereby ensure that the fresh air flowing in through inlet opening 11 has the required heated temperature. Another configuration for increasing the heat transfer from the hot exhaust air of the muffler to the fresh air coming into the air intake line 27 is to provide the latter with a plurality of lamella 28' in order to provide a larger surface 28 for transferring heat to the fresh air.

It is understood that the foregoing description is that of the preferred embodiments of the invention and that various changes and modifications may be made thereto without departing from the spirit and scope of the invention as defined in the appended claims.

What is claimed is:

1. A handheld portable tool such as a chain saw, the portable tool comprising:
   a housing;
   an internal combustion engine mounted in said housing;
   said engine including a cylinder and a piston movably mounted in said cylinder to conjointly define a combustion chamber wherein exhaust gases are developed during operation of the engine;
   an exhaust gas conduit for conducting said exhaust gases away from said combustion chamber, said exhaust gas conduit defining a cross section through which the exhaust gases flow;
   a muffler mounted on the engine and defining a collecting chamber connected to said exhaust gas conduit for receiving said exhaust gases therein;
   said collecting chamber having an exhaust outlet for passing the exhaust gases to the ambient and having a cross section greater than said cross section of said exhaust gas conduit thereby permitting the heated exhaust gases to collect in said collecting chamber before said exhaust gases pass to the ambient via said exhaust outlet;
   a carburetor mounted on said engine for supplying a mixture of fuel and air to said combustion chamber;
   an air intake conduit for conducting intake air to said carburetor; and,
   said air intake conduit being mounted so as to pass directly through said collecting chamber whereby the heat of the exhaust gases collected in said chamber is transferred through said conduit to the intake air.

2. The handheld portable tool of claim 1, said carburetor, having a carburetor air intake opening; and, said air intake conduit communicating with said air intake opening.

3. The handheld portable tool of claim 2, said tool further comprising: a plenum enclosure defining a plenum chamber communicating with said carburetor air intake opening; an air filter mounted ahead of said carburetor air intake opening; and, said conduit having a first end whereat the intake air enters said air intake conduit before passing through said collecting chamber and a second end connected to said plenum chamber and defining a conduit outlet opening through which the heated air leaves said conduit and enters said plenum chamber.

4. The handheld portable tool of claim 3, said plenum enclosure having an ancillary opening communicating with the ambient air for admitting fresh ambient air for mixing the same with the heated air passing into said plenum chamber from said conduit.

5. The handheld portable tool of claim 4, comprising temperature-dependent control means for controlling the cross section of said conduit outlet opening and the cross section of said ancillary opening.

6. The handheld portable tool of claim 1, wherein a first segment of said air intake conduit extends through said collecting chamber and has an outer surface exposed to the hot exhaust gases; and, said first segment having a plurality of lamella formed on said outer surface for increasing the heat transferred from the hot exhaust gases to the intake air as the latter passes through said first segment.

7. The handheld portable tool of claim 6, wherein a second segment of said air intake conduit extends from said collecting chamber to said carburetor; and, said second segment includes a heat insulating jacket to reduce heat loss to the ambient air.

8. A handheld portable tool such as a chain saw, the portable tool comprising:
   a housing;
   an internal combustion engine mounted in said housing;
   said engine including a cylinder and a piston movably mounted in said cylinder to conjointly define a combustion chamber wherein exhaust gases are developed during operation of the engine;
   an exhaust gas conduit for conducting said exhaust gases away from said combustion chamber, said exhaust gas conduit having a first cross section through which the exhaust gases flow;
   a muffler mounted on the engine and defining a collecting chamber connected to said exhaust gas conduit for receiving said exhaust gases therein;
   said collecting chamber having an exhaust outlet for passing the exhaust gases to the ambient;
   a carburetor mounted on said engine for supplying a mixture of fuel and air to said combustion chamber;
   an air intake conduit for conducting intake air to said carburetor;
   said air intake conduit being mounted so as to pass directly through said collecting chamber whereby the heat of the exhaust gas in said chamber is transferred through said conduit to the intake air; and,
   said exhaust outlet being offset downstream of said exhaust gas conduit so as to permit the direction of flow of said exhaust gases to be altered as they move through said collecting chamber thereby increasing the time required to flow therethrough and increasing the heat imparted to said intake air.

9. The handheld portable tool of claim 8, said exhaust gas conduit having a cross section through which the exhaust gases flow; and, said exhaust gas collecting chamber having a cross section many times greater than said cross section of said exhaust gas conduit thereby permitting the heated gases to collect in said collecting chamber before said gases pass to the ambient via said exhaust outlet.

10. The handheld portable tool of claim 9, said exhaust outlet defining an outlet cross section; and, said collecting chamber having a cross section many times greater than said outlet cross section of said exhaust outlet.

11. The handheld portable tool of claim 8, said carburetor having a carburetor air intake opening and an air filter mounted ahead of said carburetor air intake opening; and, said tool further comprising: a carburetor enclosure having an enclosure wall enclosing said carburetor and said air filter; said enclosure wall defining an interior space into which said carburetor air intake opening opens; said air intake conduit extending to said carburetor enclosure after passing through said collecting chamber and having a supply opening communicating with said interior space to supply the heated intake air to said interior space; and, said enclosure wall having an ancillary opening communicating with the ambient air for admitting fresh ambient air into said interior space for mixing the same with the heated air passing into said interior space through said supply opening of said air intake conduit.

12. The handheld portable tool of claim 11, said tool further comprising: temperature-dependent control means disposed in said interior space for controlling the cross section of said supply opening of said air intake conduit.

13. The handheld portable tool of claim 12, said enclosure wall being disposed in spaced relationship to said carburetor, said air filter and said control means to permit the air entering said interior via said ancillary opening and said supply opening of said air-intake conduit to collect and mix so as to be advantageously adjusted before entering said air intake opening of said carburetor.

14. The handheld portable tool of claim 12, said supply opening of said air intake conduit and said ancillary opening being positioned in close proximity adjacent each other so as to permit said control means to control the cross section of said supply opening of said air intake conduit and said ancillary opening.

15. The handheld portable tool of claim 11, said tool further comprising: a handle connected to said housing and said carburetor enclosure being mounted on said handle.

16. The handheld portable tool of claim 15, said housing and said carburetor enclosure conjointly defining a vibration gap separating said housing and said carburetor enclosure from each other.

17. The handheld portable tool of claim 8, wherein a first segment of said air intake conduit extends through said collecting chamber and has an outer surface exposed to the hot exhaust gases; and, said first segment having a plurality of lamella formed on said outer surface for increasing the heat transferred from the hot exhaust gases to the intake air as the latter passes through said first segment.

18. The handheld portable tool of claim 17, wherein a second segment of said air intake conduit extends from said collecting chamber to said carburetor; and, said second segment includes a heat insulating jacket to reduce heat loss to the ambient air.

19. A handheld portable tool such as a chain saw, the portable tool comprising:

a housing;

an internal combustion engine mounted in said housing and having first and second sides facing away from each other;

said engine including a cylinder and piston movably mounted in said cylinder to conjointly define a combustion chamber wherein exhaust gases are developed during operation of the engine;

an exhaust gas conduit for conducting said exhaust gases away from said combustion chamber, said exhaust gas conduit having a first cross section through which the exhaust gases flow;

a muffler mounted on said first side of said engine and defining a collecting chamber connected to said exhaust gas said collecting chamber having an exhaust outlet for passing the exhaust gases to the ambient;

said exhaust outlet having a second cross section through which the exhaust gases flow to the ambient;

a carburetor mounted on said second side of said engine for supplying a mixture of fuel and air to said combustion chamber;

an air intake conduit for conducting intake air to said carburetor;

said air intake conduit being mounted in said muffler so as to pass directly through said collecting chamber whereby the heat of the exhaust gases in said chamber is transferred through said conduit to the intake air;

said collecting chamber having a cross section greater than said first and second cross sections thereby causing the flow of the exhaust gases through said collecting chamber to be slowed so as to increase the intensity of heat transfer from the exhaust gases to the intake air conducted through said collecting chamber in said air intake conduit; and, said carburetor having a carburetor air intake opening and an air filter mounted ahead of said carburetor air intake opening;

a carburetor enclosure also mounted on said second side of said engine and having an enclosure wall enclosing said carburetor and said air filter;

said enclosure wall defining an interior space into which said carburetor air intake opening opens;

said air intake conduit extending to said carburetor enclosure after passing through said collecting chamber and having a supply opening communicating with said interior space to supply the heated intake air to said interior space; and, said enclosure wall having an ancillary opening communicating with the ambient air for admitting fresh ambient air into said interior space for mixing the same with the heated air passing into said interior through said supply opening of said air intake conduit.

20. The handheld portable tool of claim 19, said tool further comprising: temperature-dependent control means disposed in said interior space for controlling the cross section of said supply opening of said air intake conduit.

21. The handheld portable tool of claim 19, said muffler having first and second walls, said exhaust outlet being arranged in said first wall and said air intake conduit extending through said second wall so as to end in an air inlet spaced away from said exhaust outlet thereby preventing the exhaust gases from being drawn into said air inlet.

* * * * *

UNITED STATES PATENT AND TRADEMARK OFFICE
CERTIFICATE OF CORRECTION

PATENT NO. : 4,890,595

DATED : January 2, 1990

INVENTOR(S) : Hartmut Fischer

It is certified that error appears in the above-identified patent and that said Letters Patent is hereby corrected as shown below:

In column 2, line 3: delete "conduction," and substitute -- condition, -- therefor.

In column 2, line 23: delete "has" and substitute -- gas -- therefor.

In column 3, line 55: delete the comma after "retor".

In column 5, line 64: insert "a" between "and" and "piston".

In column 6, line 9: insert "conduit;" after "gas".

Signed and Sealed this

Seventeenth Day of March, 1992

Attest:

HARRY F. MANBECK, JR.

*Attesting Officer*     Commissioner of Patents and Trademarks